United States Patent [19]

Grimm

[11] Patent Number: 4,746,422

[45] Date of Patent: May 24, 1988

[54] METHOD FOR THE SEPARATION OF A MIXTURE OF PLASTIC AND CONTAMINANT

[75] Inventor: Michael J. Grimm, Maumee, Ohio

[73] Assignee: Rutgers University, Piscataway, N.J.

[21] Appl. No.: 24,827

[22] Filed: Mar. 12, 1987

Related U.S. Application Data

[63] Continuation-in-part of Ser. No. 759,218, Jul. 26, 1985, abandoned.

[51] Int. Cl.$^4$ ............................ B03B 5/34; B03B 5/44
[52] U.S. Cl. ...................................... 209/172; 209/17; 209/173; 209/211
[58] Field of Search ................. 209/211, 172, 173, 17, 209/10

[56] References Cited

U.S. PATENT DOCUMENTS

| | | | |
|---|---|---|---|
| 766,289 | 8/1904 | Schwarz | 209/173 |
| 1,195,264 | 8/1916 | Pennington | 209/172 |
| 1,839,117 | 12/1931 | Nagelvoort | 209/172 |
| 1,909,159 | 5/1933 | Ashmead | 209/172 |
| 2,538,870 | 1/1951 | Hunter | 196/19 |
| 2,670,078 | 2/1954 | Davis | 209/172 |
| 2,686,592 | 8/1954 | Miller | 209/163 |
| 3,196,141 | 7/1965 | Bradford | 260/93.7 |
| 3,243,284 | 3/1966 | Morelock et al. | 75/81 |
| 3,308,946 | 3/1967 | Mitzmager et al. | 209/5 |
| 3,335,966 | 8/1967 | Haveman | 209/173 |
| 3,385,766 | 5/1968 | Lewis | 195/96 |
| 3,516,841 | 6/1970 | Haveman | 209/173 |
| 3,869,559 | 3/1975 | Clark | 209/173 |
| 4,194,926 | 3/1980 | Barnsbee | 209/173 |
| 4,249,699 | 2/1981 | Smith et al. | 209/172 |
| 4,368,274 | 1/1983 | Scott | 521/48 |
| 4,376,700 | 3/1983 | Irons | 209/172 |
| 4,529,506 | 7/1985 | Smit | 209/172 |

FOREIGN PATENT DOCUMENTS 2914673 4/1978 Fed. Rep. of Germany.

Primary Examiner—S. Leon Bashore
Assistant Examiner—Thomas M. Lithgow
Attorney, Agent, or Firm—Emch, Schaffer, Schaub & Porcello Co.

[57] ABSTRACT

The present invention relates to a method for the separation of a mixture of plastic particles and contaminant. According to the invention, a two-phase solution composed of a halogenated hydrocarbon and water are applied to the mixture of plastic and contaminant. The two-phase solution and mixture are placed in a separator. The two-phase solution and mixture are rotated in the separator. During rotation, the plastic contained in the mixture of plastic and contaminant, which has a density less than the halogenated hydrocarbon contained in the two-phase solution, is separated by gravitation from the contaminant and carried by the water of the two-phase solution. Also during rotation, the contaminant contained in the mixture of plastic and contaminant, which has a density greater than the halogenated hydrocarbon of the two-phase solution, is separated by gravitation from the plastic and carried by the halogenated hydrocarbon of the two-phase solution. The plastic and water are ejected from one part of the separator. The contaminant and halogenated hydrocarbon are ejected from another part of the separator. The plastic is then recovered for recycling purposes.

15 Claims, 1 Drawing Sheet

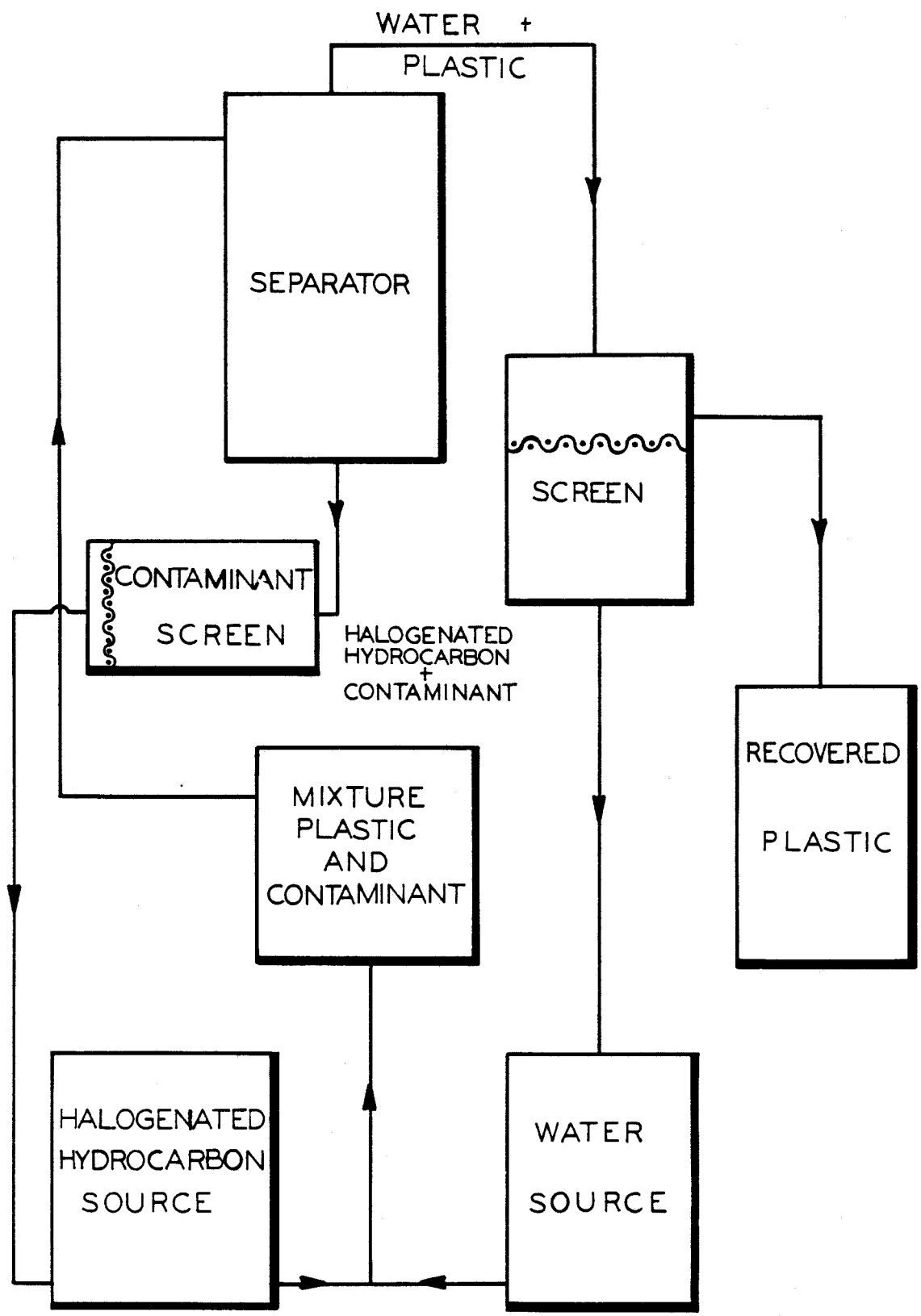

METHOD FOR THE SEPARATION OF A MIXTURE OF PLASTIC AND CONTAMINANT

The present application is a continuation-in-part of U.S. patent application, Ser. No. 759,218, filed July 26, 1985 (now abandoned).

BACKGROUND OF THE INVENTION

The present invention relates to a method for the separation of a mixture of a single type of plastic or many types of plastics and a contaminant or a number of contaminants. More particularly, it relates to a method for the separation of a mixture of particles or flakes of a plastic or plastics which have a density between 1 and 1.4 grams/cc and a contaminant or contaminants which have a density greater than 1.6 grams/cc. The present method is used primarily for the recycling of plastic bottles and containers.

The usual practice in the recycling of bottles composed of plastic is to grind the bottles into particles or flakes so that the plastic can be recovered for use in new plastic articles. Normally, a plastic bottle is ground together with other plastic bottles which results in the recovery of only plastic flakes. There are times, however, when plastic bottles are ground together with aluminum and/or glass containers which results in a mixture of plastic flakes and undesirable contaminants. The aluminum and/or glass contaminants must be extracted from the plastic flakes before the plastic can be used for the manufacture of new plastic articles.

Various methods have been developed heretofore in order to separate a mixture of a plastic and a contaminant. For example, two prior art methods are disclosed in U.S. Pat. Nos. 3,516,841 and 4,368,274. U.S. Pat. No. 3,516,841 discloses a method whereby a mixture of a plastic and a contaminant are separated by flotation in a one-phase density solution. U.S. Pat. No. 4,368,274 discloses a method of separating a mixture of polyethylene terephthalate (PET) and aluminum flakes by applying a chemical which dissolves aluminum in a mixture. The PET may then be recovered.

SUMMARY OF THE INVENTION

The present invention relates to a method for the separation of a mixture of plastic particles and contaminant. According to the invention, a two-phase solution composed of a halogenated hydrocarbon and water is applied to the mixture of plastic and contaminant. The two-phase solution and mixture are placed in a separator.

The two-phase solution and mixture are rotated in the separator. During rotation, the plastic contained in the mixture of plastic and contaminant, which has a density less than the halogenated hydrocarbon contained in the two-phase solution, is separated by gravitation from the contaminant and carried by the water of the two-phase solution. Also during rotation, the contaminant contained in the mixture of plastic and contaminant, which has a density greater than the halogenated hydrocarbon of the two-phase solution, is separated by gravitation from the plastic and carried by the halogenated hydrocarbon of the two-phase solution.

The plastic and water are ejected from one part of the separator. The contaminant and halogenated hydrocarbon are ejected from another part of the separator. The plastic is then recovered for recycling purposes.

It is the primary object of the present invention to provide an improved method for recovering plastic particles or flakes from contaminant.

Other objects and advantages of the invention will become apparent as the invention is described hereinafter in detail and with references to the accompanying drawing.

BRIEF DESCRIPTION OF THE DRAWING

The drawing is a schematic illustration of a preferred embodiment of the method of the invention.

DETAILED DESCRIPTION OF THE INVENTION

The invention relates to a method for the separation of a mixture of plastic particles and contaminant by the application to the mixture of a two-phase solution composed of a halogenated hydrocarbon and water. The plastic particles have a density between 1.0 gram/cc and 1.4 grams/cc. The contaminant or contaminants have a density greater than the halogenated hydrocarbon contained in the two-phase solution. The contaminant or contaminants usually have a density greater than 1.6 gram/cc. Examples of plastic in the above-mentioned density range are polyethylene terephthalate (PET) and polyvinyl chloride (PVC). PET has a density of 1.32 grams/cc. Examples of contaminants which have a density greater than 1.6 grams/cc are aluminum and glass. Aluminum has a density of 2.6 grams/cc.

For the purpose of explanation, PET and aluminum will be used as the constituents of the mixture to be separated by the present method. However, it is should be understood that the mixture could contain a number of different types of plastics and contaminants, either individually or in combination, which fall in the proper density ranges.

According to the invention, a halogenated hydrocarbon in a liquid state, which as a density in the range from about 1.5 grams/cc to 2.5 grams/cc, and water, which has a density of 1.0 grams/cc, are combined to form a two-phase solution. The solution forms into two phases because the halogenated hydrocarbon and water are insoluble. An example of a halogenated hydrocarbon which can be used in the accomplishment of the present method is 1,1,2-trichlorotrifluoroethane. This chemical is sold under the trademark "FREON TF". The 1,1,2-trichlorotrifluoroethane has a density of 1.57 grams/cc.

For the purpose of explanation, 1,1,2-trichlorotrifluoroethane will be used as the halogenated hydrocarbon phase of the two-phase solution. However, it should be understood that the two-phase solution could caontain a number of halogenated hydrocarbon liquids which fall in the proper density range.

The two-phase solution is composed of from about 20-50%, by weight, halogenated hydrocarbon and from about 50-80%, by weight, water. The water is used to reduce the amount of expensive halogenated hydrocarbon needed to accomplish the present method. It has been determined that halogenated hydrocarbon can be conserved by using a reduced amount of chemical along with water without affecting the results of the method. This saves money and resources.

Referring to the drawing, the halogenated hydrocarbon, such as 1,1,2-trichlorotrifluoroethane, is removed from a source container 10 while water is removed from a container 11 or other source, such as a water conduit.

The 1,1,2-trichlorotrifluoroethane and water form a two-phase solution.

The two-phase solution is applied to a mixture of PET and aluminum 12. The two-part solution is applied to the mixture of PET and aluminum wherein the mixture constitutes from about 0.5 to about 2%, by weight, of the combination of the solution and mixture. The aluminum constitutes between 0 to 5%, by weight, of the mixture.

The two-phase solution and mixture are placed into a separator 15. The use of a separator allows for the continuous feed of the two-phase solution and mixture into the separator. The separator can be a hydroclone.

The two-phase solution and the mixture of PET and aluminum are rotated in the separator 15. During rotation, the PET contained in the mixture of PET and aluminum is separated by gravitation from the aluminum and carried by the water of the two-phase solution. This occurs because the PET and water have densities which are less than the 1,1,2-trichlorotrifluoroethane. More specifically, PET, 1,1,2-trichlorotrifluoroethane and water have densities of 1.34 grams/cc, 1.57 grams/cc and 1.0 grams/cc, respectively.

Also during rotation, the aluminum contained in the mixture of PET and aluminum is separated by gravitation from the PET and carried by the 1,1,2-trichlorotrifluoroethane. This happens because the aluminum has a density which is greater than the 1,1,2-trichlorotrifluoroethane. More specifically, aluminum and 1,1,2-trichlorotrifluoroethane have densities of 2.6 grams/cc and 1.57 grams/cc, respectively. The halogenated hydrocarbon separates from the PET and water because it has a density which is greater than the densities of the PET and water. The 1,1,2-trichlorotrifluoroethane serves to carry the aluminum during the separation process.

Referring again to the drawing, the PET and water are ejected from the top of the separator 15. The PET and water are then strained through a screen 17. The PET is caught by the screen 17 and can be recovered in container 18. The water is returned to the water source 11 for future use.

The water helps to eliminate the problem of contamination of the recovered plastic by the halogenated hydrocarbon. After the halogenated hydrocarbon acts to part the plastic from the contaminant, the plastic mixes with the water while it is being separated and ejected from the separator 15. The water during this portion of the method, in effect, "washes" the halogenated hydrocarbon from the plastic. This allows for ease in recycling the plastic after it has been recovered.

As shown in the drawing, the aluminum and 1,1,2-trichlorotrifluoroethane are ejected from the bottom of the separator 15. The aluminum and 1,1,2-trichlorotrifluoroethane then pass through a contaminant screen 20 where the aluminum is caught for future use or disposal. The 1,1,2-trichlorotrifluoroethane is then returned to the halogenated hydrocarbon source 10 so that it can be reused in the recycling system.

EXPERIMENTAL DATA

Test formulas, physical properties and experimental data are set forth below.

| TRIAL | |
| --- | --- |
| Volume of 1,1,2-trichlorotrifluoroethane | 103 l. |
| Volume of water | 125 l. |
| Volume of PET | 125 ml. |
| Volume of aluminum | 20 ml. |
| Proportion of 1,1,2-trichlorotrifluoroethane to water | 45% |
| Density of 1,1,2-trichlorotrifluoroethane | 1.57 g/cc |
| Density of water | 1.0 g/cc |
| Density of PET | 1.34 g/cc |
| Density of aluminum | 2.6 g/cc |
| Temp. °C. | 25 |

EXAMPLE

An example of test conditions for the separtion of a mixture of PET (400 ml.) and aluminum (20 ml.) is by applying to the mixture a two-phase solution of 1,1,2-trichlorotrifluoroethane (103 l.) and water (125 l.) composed of 45% 1,1,2-trichlorotrifluoroethane and 55% water at a temperature of 25° C. The two-phase solution and the mixture of PET and aluminum were rotated in a hydroclone. The plastic was recovered. These conditions resulted in a 50% recovery of PET from the mixture of PET and aluminum.

The above detailed description of the present invention is given for explanatory purposes. It will be apparent to those skilled in the art that numerous changes and modifications can be made in the example of the invention described above departing from the scope of the invention. Accordingly, the whole of the foregoing description is to be construed in an illustrative and not a limitative sense, the scope of the invention being defined solely by the appended claims.

I claim:

1. A method for the separation of a mixture of plastic particles and a contaminant, which comprises the steps of:
    (a) applying a two-phase solution composed of a halogenated hydrocarbon in a liquid state and water to the mixture of plastic and contaminant;
    (b) placing said two-phase solution and the mixture of plastic and contaminant in a separator;
    (c) rotating said two-phase solution and the mixture of plastic and contaminant in the separator whereby the plastic contained in the mixture of plastic and contaminant having a density less than said halogenated hydrocarbon of said two-phase solution is separated by gravitation from the contaminant and carried by said water of said two-phase solution, and said contaminant contained in the mixture of plastic and contaminant having a density greater than said halogenated hydrocarbon of said two-phase solution is separated by gravitation from the plastic and carried by said halogenated hydrocarbon of said two-phase solution;
    (d) ejecting the plastic and said water from one part of the separator and ejecting the contaminant and said halogenated hydrocarbon from another part of the separator; and
    (e) recovering the plastic.

2. The method according to claim 1, wherein said two-phase solution is composed of from about 20–50%, by weight, halogenated hydrocarbon and from about 50–80%, by weight, water.

3. The method according to claim 1, wherein the mixture of plastic and contaminant constitutes from about 0.5 to about 2%, by weight, of the combination of said two-phase solution and the mixture.

4. The method according to claim 3, wherein the contaminant constitutes between 0 to about 5%, by weight, of the mixture of plastic and contaminant.

5. The method according to claim 1, wherein said halogenated hydrocarbon has a density in the range from about 1.5 grams/cc to 2.5 grams/cc, by weight.

6. The method according to claim 1, wherein said halogenated hydrocarbon is 1,1,2-trichlorotrifluoroethane.

7. The method according to claim 1, wherein the plastic has a density in the range from about 1 gram/cc to 1.4 grams/cc, by weight.

8. The method according to claim 7, wherein the plastic is polyethylene terephthalate.

9. The method according to claim 7, wherein the plastic is polyvinyl chloride.

10. The method according to claim 7, wherein the plastic is a combination of polyethylene terephthalate and polyvinyl chloride.

11. The method according to claim 1, wherein the contaminant is aluminum.

12. The method according to claim 1, wherein the contaminant is glass.

13. The method according to claim 1, wherein the contaminant is a combination of aluminum and glass.

14. The method according to claim 1, wherein the separator is a hydroclone.

15. The method according to claim 1, including the additional steps of:
    (a) recovering the plastic particles by straining the plastic and water through a first screen whereby the plastic is separated from said water so that the plastic is recovered and said water is reused; and
    (b) straining the contaminant and said halogenated hydrocarbon through a second screen whereby the contaminant is separated from said halogenated hydrocarbon so that the contaminant is recovered and said halogenated hydrocarbon is reused.

* * * * *